(12) United States Patent
Tian

(10) Patent No.: US 6,966,453 B2
(45) Date of Patent: Nov. 22, 2005

(54) APPARATUS AND METHOD FOR REGULATING THE DELIVERY OF BULK TABLETS TO A TABLET TRANSPORT SYSTEM

(75) Inventor: Dacheng Tian, Miramar, FL (US)

(73) Assignee: Andrx Pharmaceuticals LLC, Plantation, FL (US)

( * ) Notice: Subject to any disclaimer, the term of this patent is extended or adjusted under 35 U.S.C. 154(b) by 347 days.

(21) Appl. No.: 10/334,890

(22) Filed: Dec. 31, 2002

(65) Prior Publication Data

US 2003/0164279 A1 Sep. 4, 2003

Related U.S. Application Data

(60) Provisional application No. 60/344,894, filed on Dec. 31, 2001.

(51) Int. Cl.[7] .............................................. B06B 1/10
(52) U.S. Cl. .................... 221/200; 221/204; 414/414; 414/415

(58) Field of Search ................... 221/200, 174, 221/10, 12, 201, 202, 204, 296; 414/287, 414/288, 328, 414, 415, 519

(56) References Cited

U.S. PATENT DOCUMENTS

| | | | | |
|---|---|---|---|---|
| 2,271,726 | A | * | 2/1942 | Vogel .......................... 414/328 |
| 5,098,558 | A | * | 3/1992 | Knoll et al. ............. 209/127.3 |
| 5,294,770 | A | | 3/1994 | Riddle et al. |
| 5,399,828 | A | | 3/1995 | Riddle et al. |
| 5,558,691 | A | * | 9/1996 | Horn et al. ................... 65/335 |
| 5,783,793 | A | | 7/1998 | Emerton et al. |
| 6,099,859 | A | | 8/2000 | Cheng et al. |
| 2002/0175051 | A1 | | 11/2002 | Samson |

* cited by examiner

*Primary Examiner*—Donald P. Walsh
*Assistant Examiner*—Mark J. Beauchaine
(74) *Attorney, Agent, or Firm*—David W Barman; Ted W Whitlock

(57) ABSTRACT

This invention relates to an apparatus and method for regulating the delivery rate of bulk tablets to a tablet transportation system.

17 Claims, 3 Drawing Sheets

APPARATUS AND METHOD FOR REGULATING THE DELIVERY OF BULK TABLETS TO A TABLET TRANSPORT SYSTEM

REFERENCE TO RELATED APPLICATION

This non-provisional application claims priority to provisional application Ser. No. 60/344,894 filed Dec. 31, 2001.

FIELD OF THE INVENTION

This invention relates to the delivery of bulk tablets to a tablet transport system. More particularly, the subject invention concerns an apparatus and method that regulates the rate of delivery of bulk tablets from a hopper to a tablet transport system. Tablet transport systems are commonly used processing pharmaceutical tablets, including the drilling, printing, stamping, or packaging of manufactured pharmaceutical tablets.

BACKGROUND OF THE INVENTION

In the pharmaceutical industry, much effort has been devoted to the continued development and improvement of controlled release formulations for solid dosage forms, e.g., tablets or capsules. Controlled release dosage forms can facilitate patient compliance with a prescribed dosing regimen by allowing the patient to administer dosages fewer times during a given day which can reduce the incidence of missed or delayed dosages.

Many controlled release tablets include a hole or plurality of holes in their outer membrane to allow digestive fluids to penetrate through the membrane and initiate dissolution of the dosage form. One such example of such a dosage form can be found in U.S. Pat. No. 6,099,859, incorporated herein by reference, in which the dosage form comprises a core, a membrane, and a "passageway" which, by disclosure, may be a hole drilled by a laser. Typically, the digestive fluid enters the inner portion of the tablet which contains the active drug or other medicament, thereby dissolving or suspending the active drug. The active drug or medicament can subsequently diffuse from the inner part tablet at a controlled rate, through the passageway, and allowing said active drug or medicament to be bioavailable to the patient in a desired manner.

The processing of drilled dosage forms often involves use of a tablet processing systems. U.S. Pat. Nos. 5,294,770, 5,399,828, and 5,783,793, incorporated herein by reference, describe various systems for processing drilled tablets. These systems include descriptions, in general, for transporting tablets to a position where they are drilled by a laser. However, none of these systems address the problem of controlling the rate of delivery of bulk tablets from a hopper to the tablet transport system.

U.S. patent application Ser. No. 2002/0175051 describes a vibratory feeding system in which substrates from a hopper are fed onto two separate inclined trays. The trays each contain a central grove and "shedders" which are used to singulate the exit of the components exiting the hopper. However, singulation is not what is needed or desired in the delivery of pharmaceutical tablets to a tablet transportation system.

A common difficulty encountered in pharmaceutical processing is to provide a continuous rate of delivery of bulk tablets from a hopper to tablet transport system. A delivery rate that is too slow may result in the transport system not running at full capacity. A delivery rate that is too fast, can overload the transport system resulting in system failure. Therefore a system is needed which can address this problem by providing a controlled rate of delivery of the dosage form from a hopper to a transport system. The subject invention provides for regulating the delivery of tablets from a hopper to a tablet transport system and can be advantageous to the pharmaceutical industry.

SUMMARY OF THE INVENTION

The subject invention is an apparatus for regulating the delivery of bulk tablets from a hopper to a tablet transport system, said apparatus comprising; a movable plate for allowing regulation of the rate of discharge of tablets from said hopper to said tablet transport system.

The subject invention further comprises a method for regulating delivery of tablets from a hopper to a tablet transport system, said method comprising the adjusting a movable plate to regulate the discharge from said hopper It is an object of the invention to provide an apparatus for controlling the rate of delivery of bulk tablets from a hopper to a tablet transport system.

It is a further object to control the delivery of tablets in a manner that allows for real time adjustments in the rate of delivery without interrupting tablet processing.

It is yet a further object of the invention to allow delivery of tablets from a hopper to a transport system in a continuous manner such that said transport system may operate continuously over an extended period of time. An extended period of time would be the length of time necessary to process a commercially produced number of tablets.

It is still a further object of the invention to regulate the tablet delivery so as to allow the uninterrupted commercial processing of tablets.

It is a further object to provide a method for regulating the rate of delivery of tablets from a hopper to a tablet transport system without interrupting operation of a tablet processing system.

DETAILED DESCRIPTION OF THE PREFERRED EMBODIMENT

The subject invention concerns an apparatus which can control of the rate of delivery of tablets from a hopper to a tablet transport system. A hopper, as is commonly known in the art, comprises a holding container for bulk tablets to be delivered to a tablet processing system e.g. a tablet drilling, stamping or printing system. Typically, the hopper has a first opening, or filling port, for filling the hopper with material e.g., tablets, to be held in bulk, and a second opening, or exit port, typically substantially smaller in size compared to the first opening, whereby the material can be released from the hopper. To regulate the release of material from the hopper, the hopper can advantageously include a movable plate, which can regulate the exit rate of the tablets from the hopper, thereby providing a means for regulating the rate of delivery of material from the hopper to the transportation system during operation of the system. By providing a movable plate which is remotely operable, the operator of the system is not required to interrupt operation of the system during processing to regulate delivery of material from the hopper.

One embodiment of the subject invention comprises a hopper having an exit port and integral therewith a movable plate which is a remotely movable slide gate. The remotely movable slide gate can be adjusted to regulate the size of the opening of the exit port of the hopper. The operator can remotely adjust the position of the slide gate with a rod or bar connected directly or indirectly to the gate. Said remotely movable slide gate can be designed and positioned in either a horizontal or vertical position. Alternatively, the gate may be placed in an angular position. The remotely movable slide gate is attached to a connecting rod, which extends outward from the moving parts of the machine and allows the user to adjust the relative size of the opening during processing, without disrupting the on-going delivery in processing of tablets.

Figure 1:
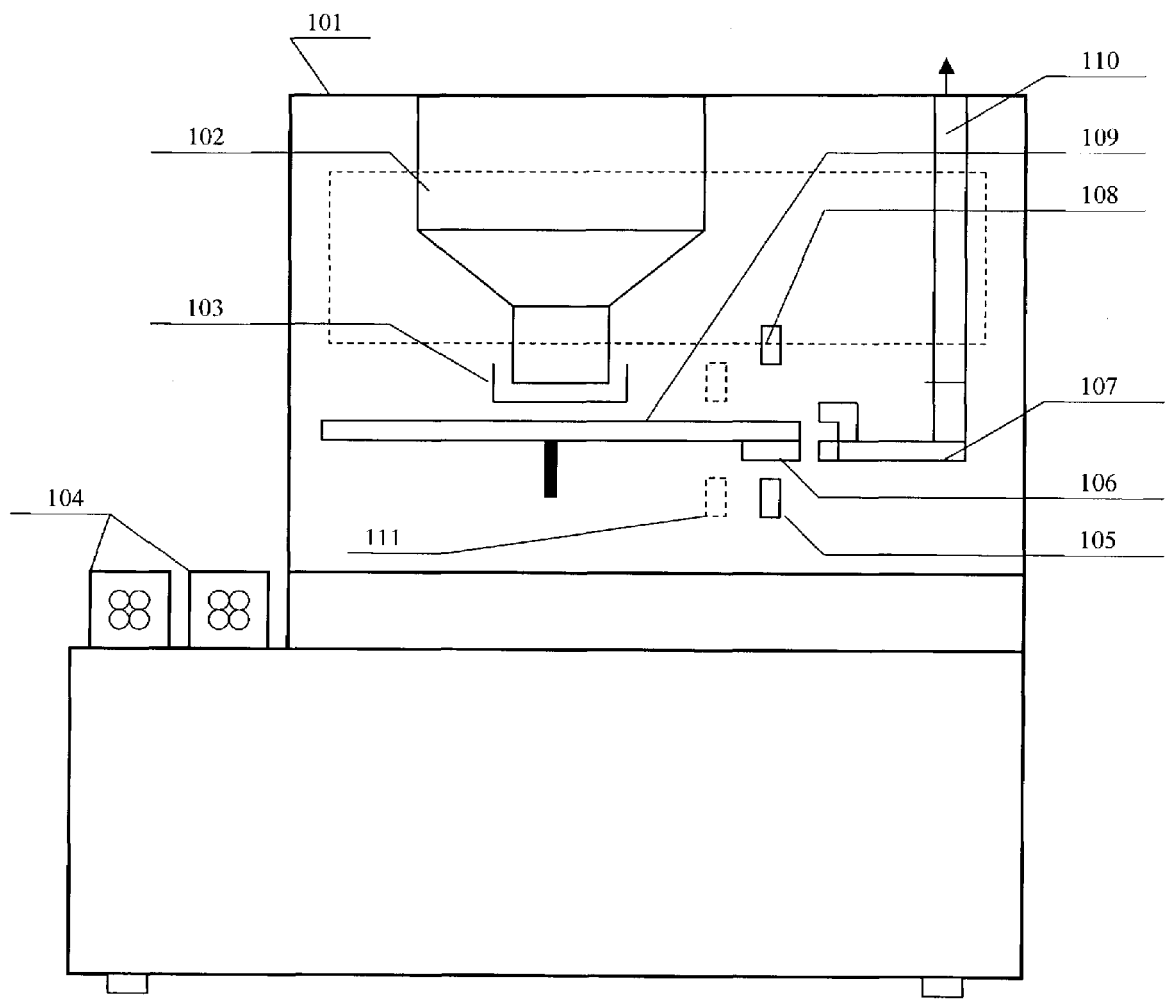
FIG. 1. shows a schematic arrangement of an overall tablet drilling system including a hopper and adjustable or vibrating plate positioned in relation to the bottom exit port for regulating the rate of delivery of tablets to a tablet transport system.

FIG. 1 shows a schematic side view of a laser tablet drilling system as is known in the art, and shows such system configured to include the system components of the subject invention. An enclosure 101 houses the components of the laser drilling system. The enclosure may be glass, plastic, metal, any combination thereof, or any other material suitable for use in a pharmaceutical manufacturing environment. The hopper 102 is placed above a tablet feeder 103 which deliver the tablets to turntable 109. The turntable has formed tablet positioning portions about the outer circumference. These formed tablet positioning portions can hold individual tablets. As the turntable revolves, individual tablets directed from the hopper by the tablet feeder are deposited into each of these formed portions. When positioned on the turntable, the tablets pass photo sensors 111 which act in concert with either or both lasers housed within manifolds 105 and 108 to fire a laser pulse at a passing tablet to drill the desired hole or holes in the tablet. Particulate created from the drilling is moved away from the drilling site by a compressed gas stream directed at the tablet from compressed gas nozzle housed within manifolds 105 and 108. The particulate remains airborne by the pressure applied by the compressed gas. This airborne particulate can then be directed into vacuum apparatus 107 and carried away from the system through exhaust vent 110. Controllers 104 allow the user to individually control upper laser housed in manifold 108 and lower laser housed in manifold 105. There may be one controller to direct all laser pulses, or each laser may have its own separate controller. FIG. 1 shows an embodiment in which two controllers are used, each controlling one of the respective two lasers.

Figure 2:
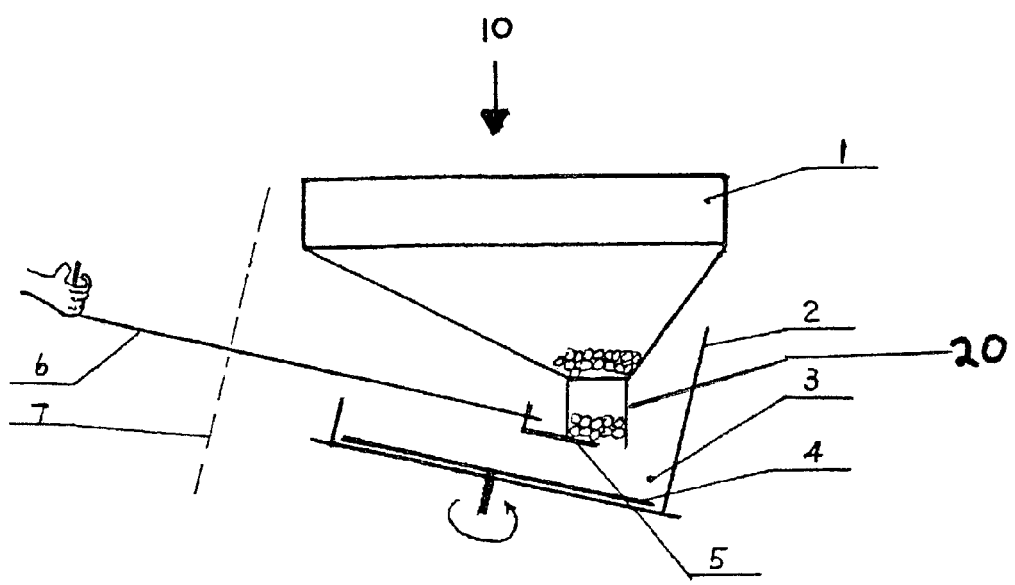
FIG. 2 shows a schematic side view of an embodiment of the subject invention comprising a movable plate positioned in relation to the hopper exit port and serving as a gate for remotely regulating the rate of delivery of tablets to a tablet transport system.

FIG. 2 shows a schematic side view of one embodiment of the current invention. Hopper 1 has a first opening 10, or filling port, for filling the hopper with material e.g., tablets, to be held in bulk. The hopper may receive said tablets either manually or automatically. The hopper is common to those of ordinary skill in the art as a receptacle by which a product is directed by gravitational, directional design to deliver in a specific region through said second opening 20, or exit port, typically substantially smaller in size compared to the first opening, whereby the material can be released from the hopper.

In the embodiment depicted in FIG. 2, the hopper delivers the tablets to a feed bowl 3. The feed bowl 3 is the receptacle by which the tablets will be held and subsequently transferred to a transport apparatus. In the embodiment depicted in FIG. 2, the transport apparatus is a feed disc 4. However, the invention can be used with any apparatus that will provide for the individual transport of tablets.

The tablets pass through exit port 20 of hopper 1 and the positioning of a remotely movable plate 5 regulates the rate at which they exit the hopper. Said remotely movable plate 5 governs the movement of the tablets, from the hopper to the feed bowl. FIG. 2 shows an embodiment wherein the remotely movable plate is a slide gate. Said remotely movable plate 5 is designed to increase and decrease the opening at the hopper exit port. Said remotely movable plate 5 also being attached to a connecting rod 6 extending outward from said remotely movable plate 5. Said connecting rod 6 allows for the remote manual adjustment of the position of said remotely movable slide gate 5, during production so as to not interrupt the processing of tablets.

Figure 3:
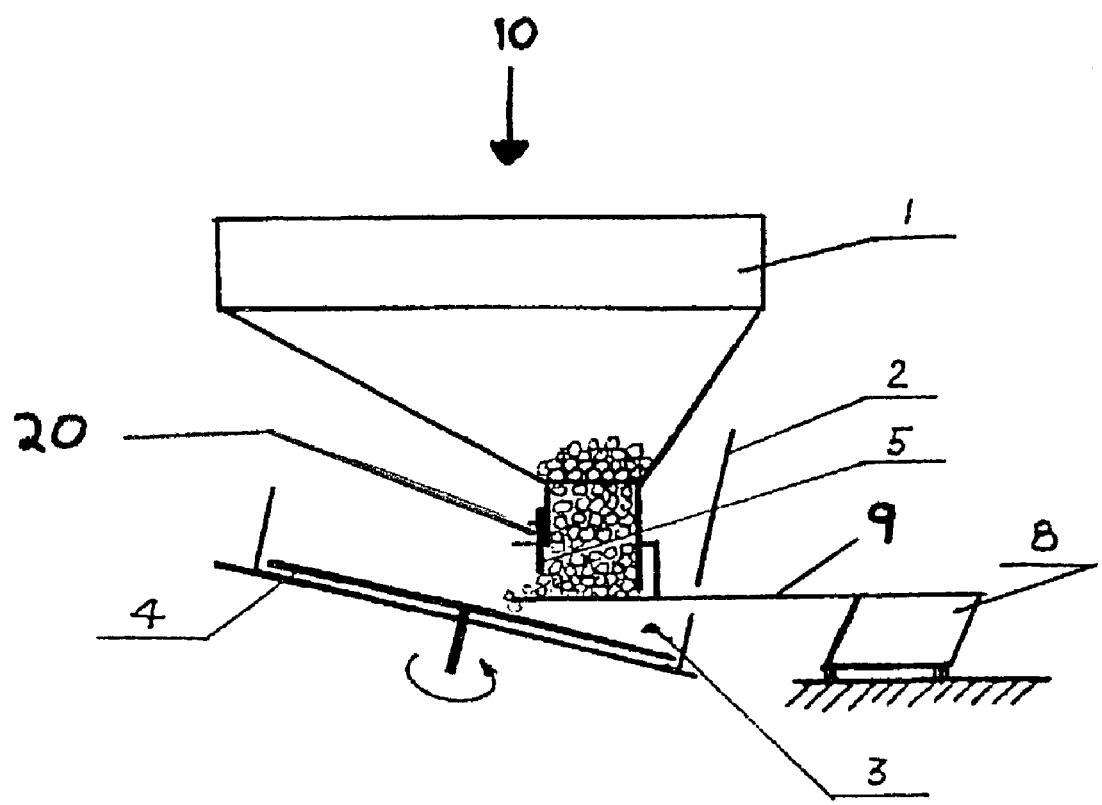
FIG. 3 shows a schematic side view of an embodiment of the subject invention having a vibrating plate positioned under the hopper exit port for regulating the rate of delivery of a tablets to a tablet transport system

Another embodiment as shown in FIG. 3, provides an oscillatory source 8 connected to the movable plate 9 generating an oscillatory motion on the movable plate 9 which imparts motion to the items being conveyed from the exit port 20 to the feed bowl 4. The oscillatory motion has a distinct directional polarity. Directional polarity is a term describing oscillatory motion in which the motion favors movement in one direction. In this embodiment, using an oscillatory source which provides directional polarity creates oscillations causing the components to be moved in one direction. The movement of tablets on such a system is controlled by the frequency and magnitude of the oscillatory motion. In the subject invention, the movable plate is connected to a source of oscillatory motion having an adjustable range of about 3000–4000 cycles per minute or Hertz (Hz). The actual setting is dependent on many variables. These include the size and mass of the tablets, the speed of the transport apparatus, and the desired rate of discharge of tablets from the hopper to the transport apparatus.

As shown in FIG. 3, said movable plate can be attached to an oscillation unit 8. Said movable plate is remotely adjustable so the delivery of tablets to the transport apparatus may be regulated and adjusted during processing without interrupting the processing. It is advantageous that the oscillation unit be adjustable. The rate of oscillation is adjusted by a rheostat, or other means as is commonly known in the art. The rate of delivery of the tablets to the feed bowl, and subsequently to transport apparatus depends upon the speed of intake of tablets by said transport apparatus.

In the method for using said apparatus, a hopper is loaded with a bulk amount of tablets. This may be done manually, semi automatically or fully automatically, or any combination thereof. A movable plate is adjusted into a desired position. Said movable plate can be an adjustable slide gate. The adjustable slide gate is manipulated during processing by a connecting rod extending outward from the machine. It is then adjusted to regulate the discharge of the tablets from the hopper to the feed bowl. Said remotely adjustable slide gate may be locked into a set position.

Alternatively, said movable plate can moved by connecting it to an oscillatory source. The movable plate is then adjusted by adjusting the frequency of the oscillation source connected to said movable plate. The frequency of oscillation can be adjusted as needed and is dependent on the rate in which tablets are taken into the transport apparatus.

The tablets are discharged into a feed bowl, which is bordered by a guard to prevent the tablets from leaving the feed bowl. In the current embodiment, the transport apparatus is a feed disk, as is commonly known in the art. However, any tablet transport can be used with the current invention. In either method, the remotely movable slide gate or the movable plate connected to an oscillation source, the adjustments that are made can be made during processing without interrupting the operation of the transport system.

Generally, the invention has been described in its preferred form or embodiment with some degree of particularity, it is to be understood that this description has been given only by way of example and that numerous changes in the details of construction, fabrication and use, including the combination and arrangement of parts, may be made without departing from the spirit and scope of the invention.

I claim:

1. An apparatus for regulating the delivery of bulk tablets from a hopper to a tablet transport system, said apparatus comprising: moveable plate for allowing regulation of the rate of discharge of tablets from said hopper to said tablet transport system wherein said moveable plate is integral with the hopper.

2. The apparatus of claim 1 where said moveable plate is remotely moveable.

3. The apparatus of claim 1 where said moveable plate is remotely adjustable during tablet processing.

4. The apparatus of claim 1 where said moveable plate is a remotely moveable slide gate.

5. The apparatus of claim 4 where said remotely moveable slide gate further comprises a connecting rod attached to said moveable plate.

6. The apparatus of claim 1 where said moveable plate forms the floor of said hopper.

7. The apparatus of claim 1 where said moveable plate vibrates.

8. The apparatus of claim 1 where said moveable plate vibrates with an oscillatory motion.

9. The apparatus of claim 8 where said oscillatory motion has a directional polarity.

10. The apparatus of claim 8 where said oscillatory motion is from a source with an adjustable frequency.

11. The apparatus of claim 10 where said adjustable frequency is in a frequency range between 3000 and 4000 Hertz.

12. The apparatus of claim 8 where said vibrations may be adjusted during tablet processing.

13. The apparatus of claim 1 where said moveable plate is positioned in a vertical or angular orientation.

14. A method for regulating delivery of tablets from a hopper to a tablet transport system, said method comprising; adjusting a moveable plate to regulate the discharge from said hopper, wherein said moveable plate is integral with the hopper.

15. The method of claim 14 wherein said adjusting of said moveable plate is carried out through manually and remotely adjusting said moveable plate with a connecting rod connected to said moveable plate.

16. The method of claim 14 wherein said adjusting of said moveable plate is carried out through remotely adjusting the frequency of an oscillation source connected to said movable plate.

17. The method of claim 14 where said moveable plate is adjusted during processing to regulate the discharge of tablets from said hopper to said transportation system.

* * * * *